United States Patent
Ramachandra Iyer et al.

(10) Patent No.: US 11,216,488 B2
(45) Date of Patent: Jan. 4, 2022

(54) METHOD AND SYSTEM FOR MANAGING APPLICATIONS IN AN ELECTRONIC DEVICE

(71) Applicant: WIPRO LIMITED, Bangalore (IN)

(72) Inventors: Manjunath Ramachandra Iyer, Bangalore (IN); Sudha Subarayan, Bangalore (IN)

(73) Assignee: Wipro Limited, Bangalore (IN)

(*) Notice: Subject to any disclaimer, the term of this patent is extended or adjusted under 35 U.S.C. 154(b) by 1080 days.

(21) Appl. No.: 15/819,366

(22) Filed: Nov. 21, 2017

(65) Prior Publication Data
US 2019/0102448 A1 Apr. 4, 2019

(30) Foreign Application Priority Data
Oct. 3, 2017 (IN) .............................. 201741035032

(51) Int. Cl.
*G06N 20/00* (2019.01)
*G06F 16/28* (2019.01)

(52) U.S. Cl.
CPC .......... *G06F 16/284* (2019.01); *G06N 20/00* (2019.01)

(58) Field of Classification Search
CPC .............................. G06F 16/284; G06N 20/00
See application file for complete search history.

(56) References Cited

U.S. PATENT DOCUMENTS

| 7,242,929 B2 * | 7/2007 | Draluk | G06F 8/60 455/418 |
| 7,269,821 B2 * | 9/2007 | Sahinoja | H04L 41/046 717/106 |
| 8,073,960 B2 * | 12/2011 | Hallamaa | H04L 41/044 709/229 |

(Continued)

OTHER PUBLICATIONS

Arsénio, Artur, et al. "Internet of intelligent things: Bringing artificial intelligence into things and communication networks." Intercooperative collective intelligence: Techniques and applications. Springer, Berlin, Heidelberg, 2014. 1-37. (Year: 2014).*

(Continued)

*Primary Examiner* — Paulinho E Smith
(74) *Attorney, Agent, or Firm* — Finnegan, Henderson, Farabow, Garrett & Dunner, LLP

(57) ABSTRACT

Embodiments of present disclosure discloses system and method for managing applications in electronic device. Initially, relation tree associated with applications is identified. The relation tree is generated based on learning technique implemented for applications, parameters, enablers associated with electronic device. Based on identified relation tree, enablers are identified from plurality of enablers, corresponding to each of applications. Further, current status of parameters based on current status of enablers is retrieved. The relation tree is updated based on learning technique implemented for at least one of the current status of the parameters, new applications, new parameters, enablers associated with the electronic device. An application from the applications is identified based on the current (Continued)

status of the parameters and the relation tree. The electronic device is instructed to perform operations associated with the identified application.

13 Claims, 8 Drawing Sheets

(56) References Cited

U.S. PATENT DOCUMENTS

| | | | |
|---|---|---|---|
| 9,070,156 B2* | 6/2015 | Linden | G06Q 30/0253 |
| 9,122,328 B2 | 9/2015 | Ananthapadmanabh et al. | |
| 9,348,409 B2* | 5/2016 | Narayanan | H04L 67/16 |
| 2015/0362959 A1 | 12/2015 | Popescu | |
| 2017/0024125 A1 | 1/2017 | Emanuel et al. | |

OTHER PUBLICATIONS

• Zhang, Min, et al. "Discovering relations between named entities from a large raw corpus using tree similarity-based clustering." International Conference on Natural Language Processing. Springer, Berlin, Heidelberg, 2005. (Year: 2005).*

• Culotta, Aron, and Jeffrey Sorensen. "Dependency tree kernels for relation extraction." Proceedings of the 42nd Annual Meeting of the Association for Computational Linguistics (ACL-04). 2004. (Year: 2004).*

* cited by examiner

METHOD AND SYSTEM FOR MANAGING APPLICATIONS IN AN ELECTRONIC DEVICE

TECHNICAL FIELD

The present application makes reference to, claims priority to, and claims benefit from Indian application number IN 201741035032 which was filed on Oct. 3, 2017. The present subject matter is related in general to the field of electronic devices, more particularly, but not exclusively to a system and method for managing applications in an electronic device.

BACKGROUND

Electronic devices include laptops, tablets, phablets, computers, smart phones, smart watches, smart televisions and the like, through which a user may be able to access one or more applications. Each of the one or more applications may be used to perform one or more operations. The one or more applications may include, but are not limited to, a chatting application, social networking application, chatting application, messaging application, music application, camera application and so on. The one or more operations may be performed based on inputs from the user associated with the corresponding electronic devices. Managing of the applications may be required to avoid performing undesired operations in the electronic devices. The undesired operation may be due to unauthorized inputs or unintentional inputs. In some scenarios, the undesired operations may be due to lack of monitoring of one or more attributes that may be associated with performance of the one or more operations.

Existing systems disclose to manage the one or more applications based on the inputs from the user at an instant of time. In the existing system, the one or more applications are managed based on the inputs and does not consider the historic data associated with the user. Also, the one or more attributes associated with the one or more applications may not be monitored for managing the one or more applications. In some existing system, the user may not be aware on why a particular operation is performed during managing of the one or more applications and the existing systems do not provide information associated the operation to the user.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to method for managing one or more applications in an electronic device. For managing the one or more applications, initially, a relation tree associated with one or more applications of an electronic device is identified. The relation tree is generated based on a learning technique implemented for the one or more applications, one or more parameters, or plurality of enablers associated with the electronic device. Based on the identified relation tree, one or more enablers are identified from the plurality of enablers, corresponding to each of the one or more applications. Further, current status of the one or more parameters based on current status of the one or more enablers is retrieved. The relation tree is updated based on the learning technique implemented for at least one of the current status of the one or more parameters, one or more new applications, one or more new parameters, plurality of new enablers associated with the electronic device. An application from the one or more applications is identified based on the current status of the one or more parameters and the relation tree. The electronic device is instructed to perform one or more operations associated with the identified application.

In an embodiment, the present disclosure relates to an application managing system for managing one or more applications in an electronic device. The application managing system includes a processor and a memory, and the memory is communicatively coupled to the processor. The memory stores processor-executable instructions which on execution cause the processor to manage the one or more applications. For managing the one or more applications, initially, a relation tree associated with one or more applications of an electronic device is identified. The relation tree is generated based on a learning technique implemented for the one or more applications, one or more parameters, or plurality of enablers associated with the electronic device. Based on the identified relation tree, one or more enablers are identified from the plurality of enablers, corresponding to each of the one or more applications. Further, current status of the one or more parameters based on current status of the one or more enablers is retrieved. The relation tree is updated based on the learning technique implemented for at least one of the current status of the one or more parameters, one or more new applications, one or more new parameters, plurality of new enablers associated with the electronic device. An application from the one or more applications is identified based on the current status of the one or more parameters and the relation tree. The electronic device is instructed to perform one or more operations associated with the identified application.

In an embodiment, the present disclosure relates to a non-transitory computer readable medium including instructions stored thereon that when processed by at least one processor cause a device to perform operations for managing one or more applications in an electronic device. For managing the one or more applications, initially, a relation tree associated with one or more applications of an electronic device is identified. The relation tree is generated based on a learning technique implemented for the one or more applications, one or more parameters, or plurality of enablers associated with the electronic device. Based on the identified relation tree, one or more enablers are identified from the plurality of enablers, corresponding to each of the one or more applications. Further, current status of the one or more parameters based on current status of the one or more enablers is retrieved. The relation tree is updated based on the learning technique implemented for at least one of the current status of the one or more parameters, one or more new applications, one or more new parameters, plurality of new enablers associated with the electronic device. An application from the one or more applications is identified based on the current status of the one or more parameters and the relation tree. The electronic device is instructed to perform one or more operations associated with the identified application.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

Figure 1A:
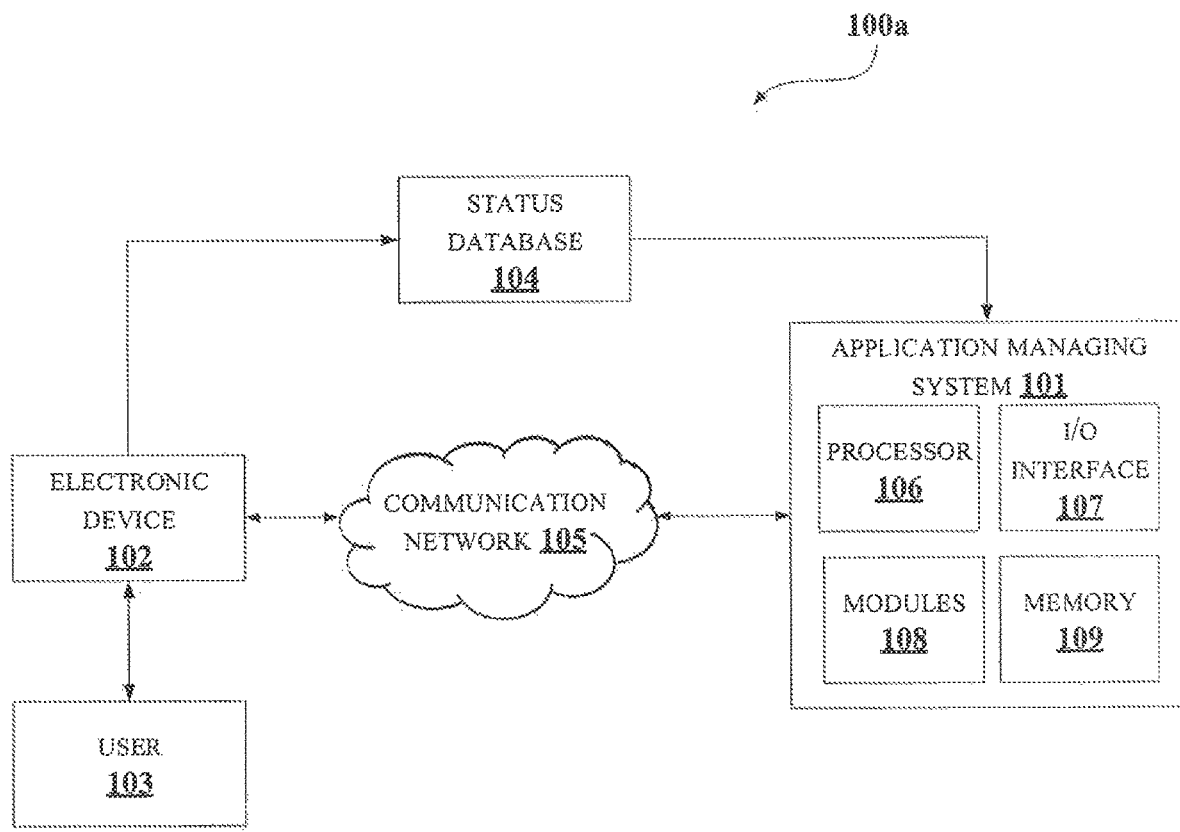
FIGS. 1a and 1b illustrate exemplary environments for managing one or more applications in electronic device in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION in the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The terms "includes", "including", or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "includes . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

User may be able to access one or more applications via one or more electronic devices to perform one or more operations. The one or more electronic devices may include, but are not limited to, laptops, tablets, phablets, computers, smart phones, smart watches, smart television and the like. In an embodiment, the one or more electronic devices may be any device which provisions access of the one or more applications to the user. The one or more applications may include, but are not limited to, chatting applications, social networking applications, messaging application, music application, camera application and so on. The one or more applications may be any application through which the user performs desired operation. The one or more operations may include, but are not limited to, sending a message, receiving a message, transferring data, receiving data, capturing an image, making a call and so on. Each of said one or more operations are associated with corresponding application. For example, operation of capturing an image may be associated with the camera application, sending a message may be associated with the messaging application, transferring data may be associated with the chatting application and so on. Further, each of the one or more applications may be associated with one or more parameters and plurality of enablers for performing corresponding one or more operations. The plurality of enablers may be attributes which may be used as triggers to initiate the one or more operations of corresponding application. The one or more parameters may be attributes which may be used for performing the one or more operations of the corresponding application.

The present disclosure discloses a method and a system for managing one or more applications in an electronic device. The present disclosure may implement an efficient learning technique for managing the one or more applications. By the learning technique, the plurality of the enablers and the one or more parameters, associated with one or more electronic devices may be monitored and a relation tree associated with one or more applications of the corresponding electronic device may be generated. The relation tree for the electronic device, for which the one or more applications need to be managed, may be identified. The one or more enablers associated with each of the one or more applications may be identified from the relation tree. Based on the current status of the one or more enablers, the one or more parameters may be identified for the one or more applications and current status of the one or more parameters may be retrieved. The current status of the parameters checked with the relation tree to identify an application from the one or more applications. The electronic device may be instructed to perform one or more operations associated with the identified application. Further, the learning technique may be implemented to update the relation tree of each of the one or more electronic device. For the updating, at least one of the current status of the one or more parameters, one or more new applications, one or more new parameters, plurality of new enablers associated with the electronic device may be monitored.

FIG. 1a illustrates an exemplary environment 100a for managing one or more applications in an electronic device 102 in accordance with some embodiments of the present disclosure. The exemplary environment 100a comprises an application managing system 101, the electronic device 102, a user 103 associated with the electronic device 102, a status database 104 and a communication network 105. The application managing system 101 may be configured to manage the one or more applications in the electronic device 102. The application managing system 101 may communicate with the electronic device 102 via the communication network 105. The application managing system 101 may communicate with the electronic device 102 for retrieving and providing data which may be used for managing the one or more applications. The application managing system 101 may also manage the one or more applications in the electronic device 102 via the communication network 105. In an embodiment, the communication network 105 may include, without limitation, a direct interconnection, Local Area Network (LAN), Wide Area Network (WAN), wireless network (e.g., using Wireless Application Protocol), the Internet, and the like.

In an embodiment, the application managing system 101 may be embedded in the electronic device 102 for managing the one or more applications of the electronic device 102.

Further, the application managing system 101 includes a processor 106, I/O interface 107, one or more modules 108 and a memory 109. In some embodiments, the memory 109 may be communicatively coupled to the processor 106. The memory 109 stores processor executable instructions, which, on execution, may cause the application managing system 101 to manage the one or more applications of the electronic device 102. The application managing system 101 may be implemented in a variety of computing systems, such as a laptop computer, a desktop computer, a Personal Computer (PC), a notebook, a smartphone, a tablet, e-book readers (e.g., Kindles and Nooks), a server, a network server, and the like.

The status database 104 may be a repository associated with the electronic device 102 and the application managing system 101. In an embodiment, status of the one or more applications, one or more parameters and plurality of enablers associated with the electronic device 102 may be retrieved from the status database 104 by the application managing system 101. In an embodiment, the status of the one or more applications, the one or more parameters and the plurality of enablers may be retrieved and stored by the status database 104 from corresponding source. Further, the stored status of the one or more applications, the one or more parameters and the plurality of enablers may be provided to the application managing system 101 for managing the one or more applications. In an embodiment, the status database 104 may be configured to provide current status of the one or more applications, the one or more parameters and the plurality of enablers at real-time to the application managing system 101. In an embodiment, the status of the one or more applications, the one or more parameters and the plurality of enablers may be retrieved from the corresponding source directly by the application managing system 101. In an embodiment, the status database 104 may be embedded in one of the application managing system 101 and the electronic device 102 (not shown in the figure).

Figure 1B:
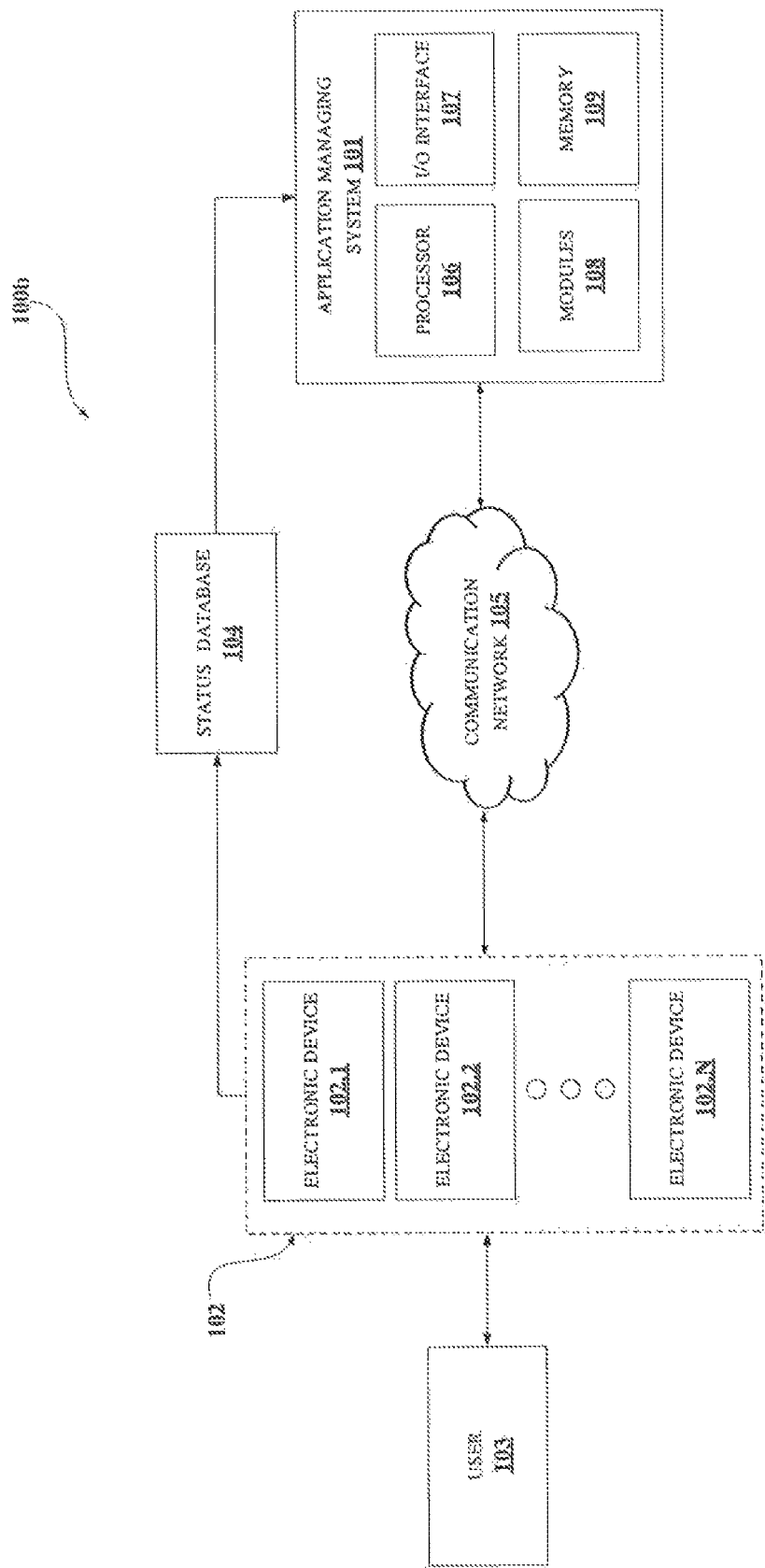

The application managing system 101 may be associated with one or more electronic devices 102.1 . . . 102.N (hereafter referred to as the one or more electronic devices 102) as shown in FIG. 1b. As shown in the figure the exemplary environment 100b comprises the application managing system 101, the one or the electronic devices 102, the user 103 associated with the one or more electronic devices 102, the status database 104 and a communication network 105. The application managing system 101 may be configured to manage the one or more applications in the one or more electronic devices 102. In an embodiment, one or more users may be associated with the one or more electronic devices 102. In an embodiment, each of the one or more electronic devices 102 may be associated with a status database (not shown in the figure) and the application managing system 101 may retrieve the status from the corresponding status database 104. Each of the one or more electronic devices 102 may be associated with corresponding relation tree. For managing the one or more applications of an electronic device 102 (consider the electronic device illustrated in FIG. 1a) from the one or more electronic devices 102, the application managing system 101 identifies the relation tree associated with the one or more applications of the electronic device 102. In an embodiment, when configuring the application managing system 101 with the one or more electronic devices, the application managing system 101 may generate a relation tree for each of the one or more electronic devices 102. In an embodiment, the application managing system 101 may generate a relation tree for each of the one or more applications in each of the one or more electronic devices 102. The generated relation tree may be stored in the memory 109 of the application managing system 101. In an embodiment, the generated relation tree may be stored in an external database associated with the application managing system 101 (not shown in Figure) and the identified relation tree may be retrieved from the external database for managing the one or more applications. The relation tree may be generated based on learning technique implemented for the one or more applications, the one or more parameters, the plurality of enablers associated with the electronic device 102. In an embodiment, the plurality of enablers may be attributes which may be used as triggers to initiate one or more operations of corresponding application. In an embodiment, the one or more parameters may be attributes which may be used for performing the one or more operations of the corresponding application.

For example, consider the electronic device 102 to be a smartphone with a messaging application and an operation to be performed may be sending a message. For the given example, input from the user 103 to initiate sending of the message from the messaging application may be an enabler associated with the messaging application. The one or more parameter associated with sending of the message may be network connectivity of the smartphone. Consider another example with the electronic device 102 to be a smart watch with a navigation application and the operation to be performed may be providing navigation to a destination provided by the user 103. The one or more enablers of the given example may be the destination input provided by the user 103 and the one or more parameters for providing the navigation may be Wireless-Fidelity (Wi-Fi) connectivity of the smart watch.

In an embodiment, the relation tree may indicate dependency of the one or more operations associated with corresponding application with the one or more parameters and the plurality of enablers. For the electronic device 102, each of the one or more applications may correspond to one or more enablers from the plurality of enablers. The application managing system 101, upon identifying the relation tree, identifies the one or more enablers from the plurality of enablers in the relation tree.

In an embodiment, upon identifying the one or more enablers, current status of the identified one or more enablers may be monitored by the application managing system 101, in an embodiment, the current status may be retrieved from the status database 104. Based on the current status of the one or more enablers, current status of the one or more parameters may be retrieved by the application managing system 101. The current status of the one or more parameters may also be retrieved from the status database 104. In an embodiment, the current status of the plurality of enablers and the one or more parameters may be retrieved directly from the corresponding sensors. In another embodiment, the current status of the plurality of enablers and the one or more parameters may be retrieved from the electronic device 102. In an embodiment, the one or more parameters may comprise at least one of user parameters, environment parameters and application parameters. The one or more parameters may include any other parameters that may be associated with the one or more operations. The user parameters may be attributes associated with the user 103 of the electronic device 102. For example, the user parameters may be touch gestures provided by the user 103, face recognition of the user, finger print input from the user 103 and so on. The environment parameters may be attributes associated with environment of the electronic device 102. For example, the environment parameters may include, but are not limited to, weather condition at location of the electronic device 102, changes in location of the user device and so on. The application parameters may be attributes associated with the one or more applications of the electronic device 102. For example, the application parameters may be data connectivity 403 for the chatting application of the electronic device 102, network connectivity 404 for the messaging application of the electronic device 102 and so on.

In an embodiment, consider the electronic device 103 may be a Bluetooth enabled music player. The one or more enablers associated with the Bluetooth enabled music player may be identified to be power supply, one of presence and absence of Compact Disk (CD), signal form a remote controller and the like. Consider the current status of the of said one or more enablers may be power supply is ON, presence of the CD and no signal from the remote controller. Based on the current status of the one or more enablers, the one or more parameters may be identified to be parameters associated with CD reader application and Bluetooth enabled headset application of the Bluetooth enabled music player. Based on the current status of the said parameters, the Bluetooth enabled music player may be instructed to perform one or more operations associated with at least one of the CD reader application and the Bluetooth enabled headset application.

In an embodiment, the relation tree of the electronic device 102 may be updated based on the learning technique implemented for at least one of the current status of the one or more parameters, one or more new applications, one or more new parameters, plurality of new enablers associated with the electronic device 102. The updating of the relation tree may be performed when the application managing system 101 detects at least one of the current status of the one or more parameters, the one or more new applications, the one or more new parameters, the plurality of new enablers. In an embodiment, the updating of the relation tree may be performed when the current status of the one or more parameters may be detected to be unique, by the application managing system 101, when compared to previous current status of the one or more parameters. In an embodiment, the updating may be performed when the application managing system 101 detects that a new application may be downloaded in the electronic device 102. In an embodiment, the updating may be performed when the application managing system 101 detects that one or more new parameters may be associated with the one or more applications in the electronic device 102. In an embodiment, the updating may be performed when the application managing system 101 detects that plurality of new enablers is associated with the one or more applications in the electronic device 102. The updating of the relation tree based on the learning technique may comprise monitoring status of at least one of the one or more parameters, the one or more new parameters, the one or more new applications, and the plurality of new enablers. In an embodiment, the monitoring may be performed for a predefined number of occurrences of the one or more operations associated with corresponding new one or more applications. Further, the relation tree may be updated based on the monitoring. The updated relation tree may comprise dependency of the one or more operations with the one or more new parameters, the one or more parameters, the plurality of enablers and the plurality of new enablers. In an embodiment, when a new application is associated with the electronic device 102, at least one of the one or more new parameters and the plurality of new enablers may be detected along with the new application. Here, the relation tree of the electronic device 102 may be updated based on learning technique implemented for the new application, the one or more new parameters and the plurality of new enablers.

Upon retrieving the current status of the one or more parameters, the application managing system 101 may identify an application from the one or more applications, based on the current status of the one or more parameters and the relation tree. In an embodiment, the current status of the one or more parameters may be compared with the relation tree for the identification. The application managing system 101 may be configured to instruct the electronic device 102 to perform the one or more operations associated with the identified application.

In an embodiment, the application managing system 101 may be configured to provide a notification relating to at least one of the identified application and the one or more operations, to the user 103. In an embodiment, the notification may be provided to the user 103 upon receiving a request for the notification from the user 103.

In an embodiment, the application managing system 101 may receive data from the electronic device 102, the status database 104 and other associated data for managing the one or more applications 211 through the I/O interface 107 of the application managing system 101. Also, the application managing system 101 may transmit data to the electronic device 102 and other associated data for managing the one or more applications via the I/O interface 107, The I/O interface 107 may be coupled with the processor 106 of the application managing system 101.

Figure 2:
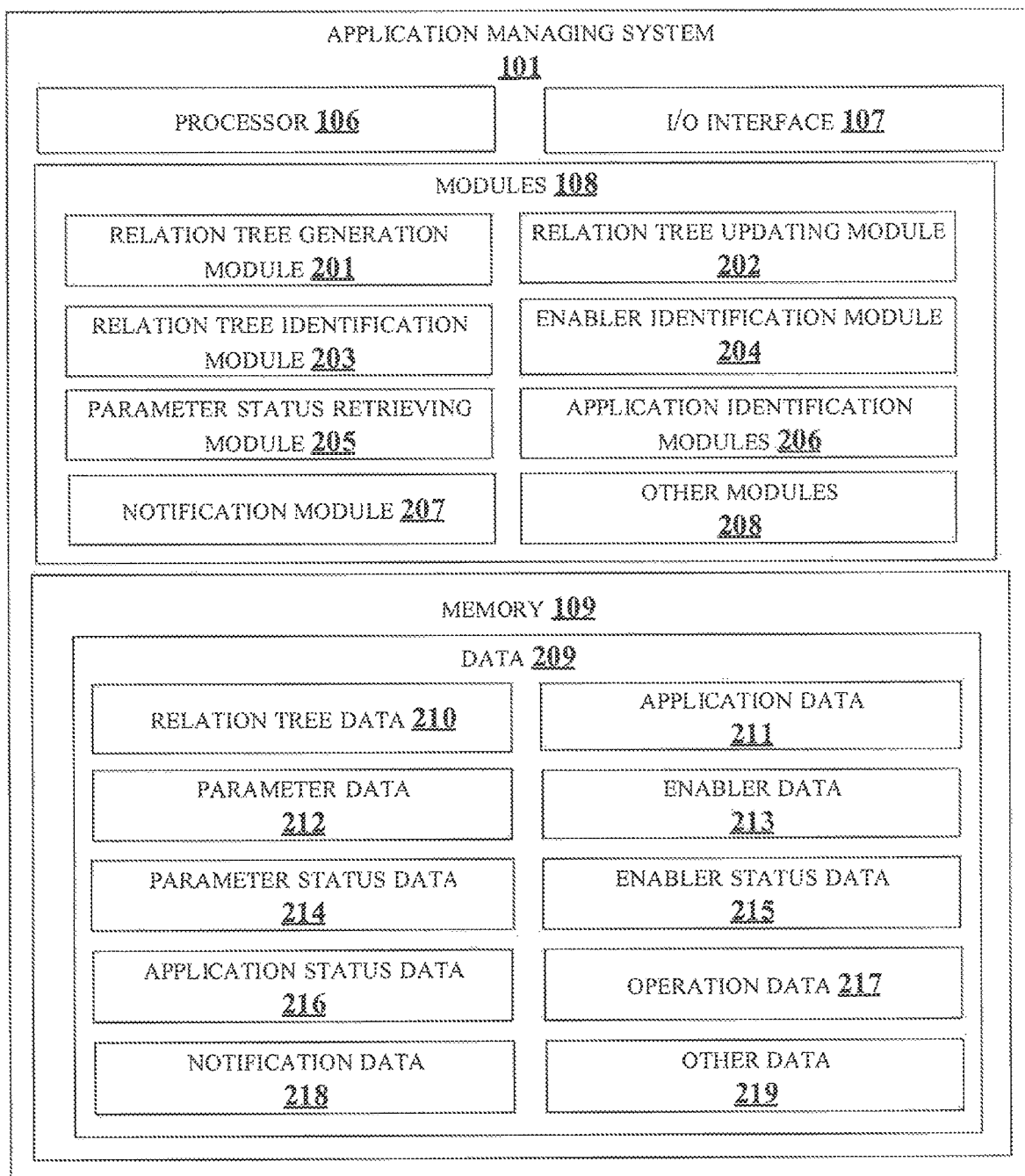
FIG. 2 shows a detailed block diagram of an application managing system for managing one or more applications in an electronic device in accordance with some embodiments of the present disclosure.

FIG. 2 shows a detailed block diagram of the application managing system 101 for managing the one or more applications in the electronic device 102 in accordance with some embodiments of the present disclosure.

The data 209 in the memory 109 and the one or more modules 108 of the application managing system 101 may be described herein in detail.

In one implementation, the one or more, modules 108 may include, but are not limited to, a relation tree generation module 201, a relation tree updating module 202, a relation tree identification module 203, an enabler identification module 204, a parameter status retrieving module 205, an application identification module 206, a notification module 207 and one or more other modules 208 associated with the application managing system 101.

In an embodiment, the data 209 in the memory 109 may comprise a relation tree data 210 (also referred as at least one of a relation tree 210 and an updated relation tree 210), an application data 211 (also referred as one or more applications 211), a parameter data 212 (also referred as one or more parameters 212), an enabler data 213 (also referred as plurality of enablers 213), a parameter status data 214 (also referred as at least one of current status of one or more parameters 214 and status of one or more parameters 214), an enabler status data 215 (also referred as at least one of current status of plurality of enablers 215 and status of plurality of enablers 215), an application status data 216 (also referred as at least one of current status of one or more applications 216 and status of one or more applications 216), an operation data (also referred as one or more operations), a notification data 218 (also referred as the notification 218) and other data 219 associated with the application managing system 101.

In an embodiment, the data 209 in the memory 109 may be processed by the one or more modules 108 of the application managing system 101. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The modules when configured with the functionality defined in the present disclosure may result in a novel hardware.

Consider the electronic device 102 may be smartphone and the one or more applications 211 in the smartphone may include, but are not limited to, a chatting application, a social networking application, a messaging application, music application, camera application and so on. In an embodiment, performing of one or more operations 217 associated with corresponding application may be dependent on at least one of the one or more parameters 212 and the plurality of enablers 213. The one or more operations 217 associated with the one or more applications 211 may include, but are limited to, enabling an application, disabling an application, transferring a data. sending a message, capturing an image, accessing Internet and so on. Each of said one or more operations 217 may be associated with corresponding application. For example, operation of capturing an image may be associated with the camera application, at least one of sending the message may be associated with the messaging application and transferring the data may be associated with one of the chatting application, capturing the image may be associated with the camera application and so on. The one or more operations 217 of the one or more applications 211 may be based on the one or more parameters 212 and the one or more enablers 213 associated with the smartphone. For example, the user 103 initiating to send a message through the messaging application may be the one or more enablers 213 and the network connectivity may be the one or more parameters 212 for sending the message through the messaging application.

In an embodiment, consider the electronic device 102 may be smart watch and the one or more applications 211 in the smart watch may include, but are not limited to, a navigation application, a call initiating application, a messaging application, music application, document reader application, and so on. The one or more operations 217 associated with the one or more applications 211 may include, but are limited to, providing navigation to a destination, initiating a call, playing music, receiving a message and so on. Each of said one or more operations 217 may be associated with corresponding application. For example, operation of providing navigation to the destination may be associated with the navigation application, playing music may be associated with the music application, receiving the message may be associated with the messaging application and so on. The one or more operations 217 of the one or more applications 211 may be based on the one or more parameters 212 and the one or more enablers 213 associated with the smart watch. For example, the user 103 providing a destination for navigation through the navigation application may be the one or more enablers and the Wi-Fi connectivity may be the one or more parameter for the navigation through the navigation application.

In an embodiment, consider the electronic device 102 may be smart television and the one or more applications 211 in the smart television may include, but are not limited to, a channel changing application, data streaming application, sound setting application, screen setting application and so on. The one or more operations 217 associated with the one or more applications 211 may include, but are limited to, changing channel of the smart television, changing sound effects of the smart television, changing display of the smart television and so on. Each of said one or more operations 217 may be associated with corresponding application. For example, operation of providing changing sound effect of the smart television may be associated with the sound setting application, changing the channel of the smart television may be associated with the channel changing application and so on. The one or more operations of the one or more applications 211 may be based on the one or more parameters 212 and the one or more enablers 213 associated with the smart television. For example, detection of manual change in the channel by the user 103 through the channel changing application may be enablers and the channel changed to a sports channel may be the one or more parameters 212 for changing the sound effects in the smart television through the sound setting application.

For managing the one or more applications 211 of the electronic device 102, the relation tree identification module 203 identifies the relation tree 210 associated with the one or more applications 211 of the electronic device 102. In an embodiment, the relation tree generation module 201 may generate the relation tree 210 for the electronic device 102 based on the learning technique implemented for the one or more applications 211, the one or more parameters 212, the plurality of enablers 213 associated with the electronic device 102. In another embodiment, the relation tree generation module 201 may generate a relation tree 210 for each of the one or more applications 211 in the electronic device 102, in an embodiment, the relation tree generation module 201 may be outside the application managing system 101 and communicatively connected to the application managing system 101. In an embodiment, the relation tree 210 may be generated by retrieved data from internal application directories of the electronic device 102. List of the one or more applications 211 may be retrieved from application files of the electronic device 102. Data may include at least one of the one or more parameters 212, the one or more operations 217, the plurality of enablers for the application. In an embodiment, one or more learning techniques known to a person skilled in the art may be implemented for the generation.

The relation tree 210 generated by said relation tree generation module 201 may be retrieved from the relation tree generation module 201 when required for managing the one or more applications 211 in the electronic device 102. The generated relation tree 210 may be stored in the memory 109 of the application managing system 101. The relation tree 210 may comprise plurality of nodes associated with the one or more parameters 212, the one or more operations 217, the plurality of enablers 213 for an application from the one or more applications 211. In the relation tree 210, the plurality of nodes may be connected to at least one of plurality of other nodes. The connection of the plurality of nodes in the relation tree may indicate the dependency of the one or more operations 217 of the application with the one or more parameters 212 and the plurality of enablers 213. In an embodiment, each of the plurality of nodes associated with the one or more parameters 212 and the plurality of enablers 213 may be corresponding conditions to be satisfied for performing the one or more operations 217 associated with the corresponding application.

In an embodiment the application managing system 101 may be configured with more than one electronic device (as illustrated in FIG. 1b), a relation tree 210 for each of the one or more electronic devices may be generated. The application managing system 101 may identify the relation tree 210 associated with the electronic device 102 for which the one or more applications 211 is to be managed. Consider the one or more electronic devices to be a smart phone, a tablet, a smart watch and a smart television and so on. For managing the one or more applications 211 in the smart phone, the relation tree associated with the smart phone may be identified and retrieved by the application managing system 101. Similarly, for managing applications in the smart watch, the relation tree 210 associated with the smart watch may be identified and retrieved by the application managing system 101. In the identified relation tree 210, each of the one or more applications 211 of the corresponding application may be associated with the one or more enablers from the plurality of enablers 213. In an embodiment, the one or more enablers of the corresponding application may act as trigger for performing the one or more operations 217 associated with the application. The enabler identification module 204 may be configured to identify the one or more enablers of each of the one or more applications 211. For example, the one or more enablers 213 associated with the messaging application of the smart phone may be a user initiating to send a message.

Upon the identification, the current status of the one or more enablers may be monitored. When conditions associated with the one or more enablers in the relation tree 210 may be satisfied based on the current status of the one or more enablers, the one or more parameters 212 associated with the application relating to the one or more enablers may be identified. For example, when the current status is retrieved to be initiation of sending of the message by the user 103, the one or more parameters 212 may be network connectivity of the smart phone.

Further, the current status of the identified one or more parameters 212 may be retrieved. In an embodiment, by using the current status of the enablers, the dependency of performing the one or more operations 217 of the application with at least one of the one or more parameters 212 and the one or more enablers may be recognised.

Figure 4A:
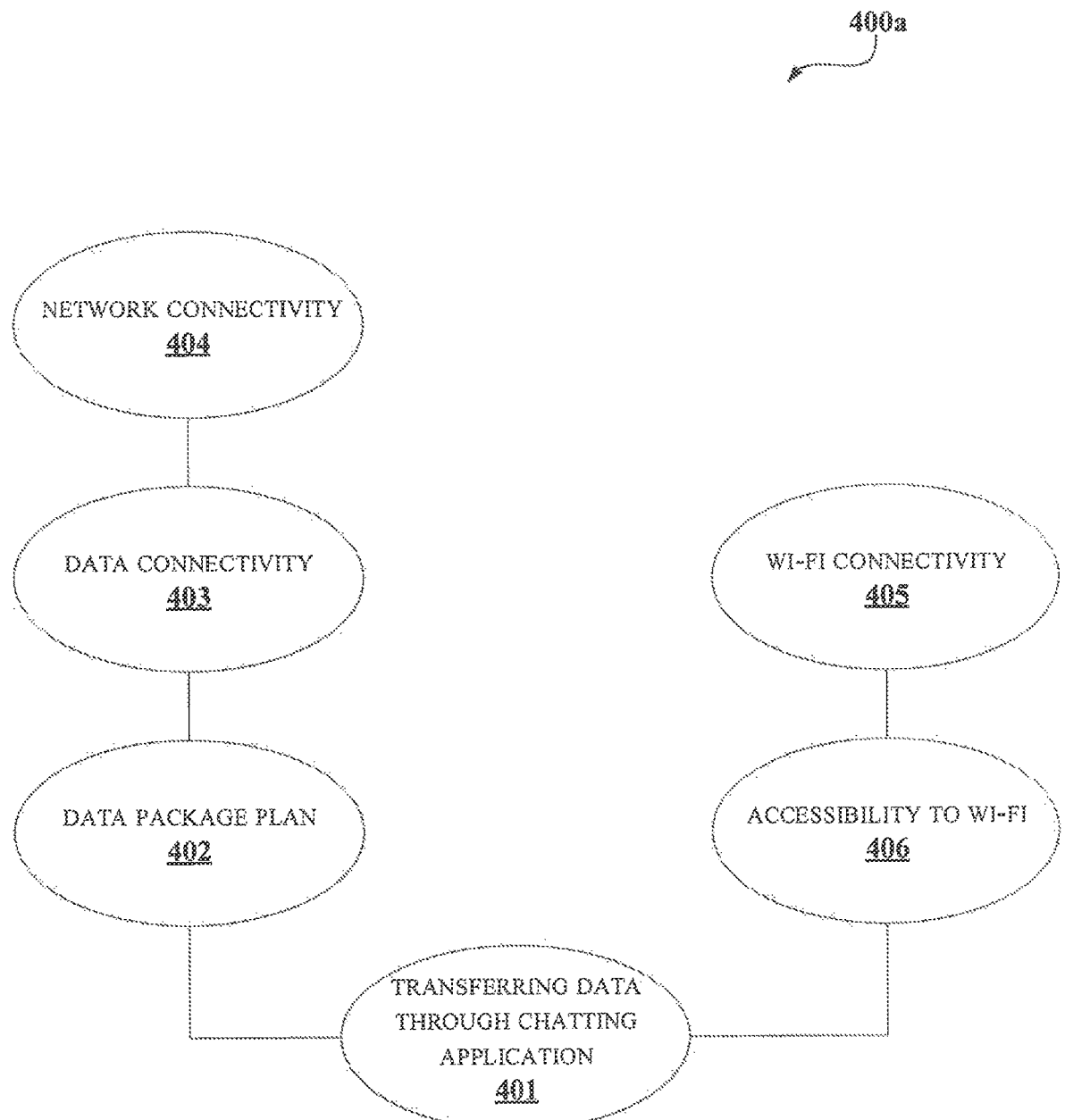
FIG. 4a shows an exemplary representation of dependency of operation of an application with one or more parameters and one or more enablers in accordance with some embodiments of present disclosure.

Consider the application to be the chatting application. An exemplary representation of dependency of the one or more operations 217 associated with the chatting application with the one or more parameters 212 is illustrated in FIG. 4a as a relation tree 400a. The relation tree 400a comprises the plurality of nodes 401 . . . 406 for the one or more parameters 212 and the one or more operations 217 associated with the chatting application. By the learning technique, the dependency of the chatting application with the one or more parameters 212 may be identified. The one or more parameters 212 may be network connectivity 404, data connectivity 403, data package plan 402, Wi-Fi connectivity 405 and accessibility to Wi-Fi connectivity 406. The one or more operations 217 associated with the chatting application may be data transfer 401 through the chatting application. In an embodiment, by the learning technique, it may be identified that the network connectivity 404 may be required for the data transfer 401 through the chatting application and also the data transfer 401 can be performed when the data connectivity 403 is available and the user 103 subscribes to a data package plan 402. Also, it may be identified that the data transfer 401 through the chatting application may be performed if the Wi-Fi connectivity 405 along with accessibility to Wi-Fi connectivity 406 is available. The accessibility to the Wi-Fi connectivity 406 may be provided with login credentials. Based on the identified dependencies of the chatting application with the one or more parameters 212, the relation tree 400a may be generated. In an embodiment, the one or more enablers associated with the chatting application may be power supply provided to the electronic device 102 associated with the chatting application. Based on the status of the one or more enablers i.e., the status of the power supply, the one or more one or more parameters may be identified. For example, when the status of the power supply is ON, based on the relation tree, the application managing system 101 may identify the one or more parameters to be network connectivity 404, data connectivity 403, data package plan 402, Wi-Fi connectivity 405 and accessibility to Wi-Fi connectivity 406.

In an embodiment, upon identifying the one or more parameters 212 based on current status of the one or more enablers, current status of the identified one or more parameters 212 may be monitored. In an embodiment, the current status may be retrieved from the status database 104. Based on the current status of the one or more parameters 212, the application may be identified by the application identification module 206. For example, if the network connectivity 404, the data connectivity 403 and the data package plan 402 may be monitored to be available, the application may be recognised to be chatting application and the electronic device 102 may be instructed to perform the one or more operations 217 i.e., the data transfer 401 through the chatting application. In another scenario if the Wi-Fi connectivity 405 is available and the accessibility to Wi-Fi connectivity 406 is available, the electronic device 102 may be instructed to perform the one or more operations 217 i.e., the data transfer 401 through the chatting application.

Figure 4B:
FIG. 4b shows an exemplary representation of updated dependency of operation of an application with one or more parameters and one or more enablers in accordance with some embodiments of present disclosure.

In an embodiment, the relation tree 400a may be updated based on the learning technique implemented for at least one of the current status of the one or more parameters 212, one or more new applications, one or more new parameters, plurality of new enablers associated with the electronic device 102. The updating of the relation tree 400a may be performed by the relation tree updating module 202, when the application managing system 101 detects at least one of the current status of the one or more parameters, the one or more new applications, the one or more new parameters, the plurality of new enablers. By updating the relation tree 400a, an updated relation tree 400b may be generated and stored in the memory of the application managing system 101. The updated relation tree 400b may replace the relation tree associated with corresponding application. By updating the relation tree 400a, the dependency associated with performing the one or more operations 217 may vary. Consider attributes associated with antenna of the smart phone may be detected to be one or more new parameters 212. By monitoring, it may be detected that the network connectivity 404 may be depending upon status of antenna 407 associated with the electronic device 102. For example, when the status of the antenna 407 may be unavailable, the network connectivity 404 may be unavailable. Upon monitoring for predetermined number of occurrence of the data transfer 401, the relation tree updating module 202 may identify that the data transfer 401 depends on the status of antenna 407. Therefore, the relation tree 400a may be updated to the updated relation tree 400b by adding a new parameter associated with the antenna 407. Hence the current status of the antenna 407 may also be retrieved to perform operation of the data transfer 401, if the network connectivity 404 may be available. An exemplary representation of the updated relation tree 400b is illustrated in FIG. 4b.

Further, directional gain associated with the antenna of the smart phone is detected to the one or more new parameter. In an embodiment, the directional gain may be measurement of efficiency of the antenna when held in a particular direction, relative to tower associated with the smart phone. By monitoring the directional gain and performance of the antenna, the relation tree 400b may be further updated by including the directional gain as one of the plurality of nodes of the relation tree 400b. In an embodiment, when the current status of directional gain is low, the application managing system may instruct the smart phone to not to perform the data transfer through the chatting application.

In an embodiment, the application managing system 101 may be configured to provide a notification 218 relating to at least one of the identified application and the one or more operations 217, to the user 103. In an embodiment, the notification 218 may be provided to the user 103 by the notification module 207 upon receiving a request for the notification 218 from the user 103. For example, when the user 103 is not able to perform the data transfer 401 through the chatting application, the user 103 may send a request to the application managing system 101 requesting for a reason for not being able to perform the data transfer 401. In an embodiment, the user 103 may send the request via the electronic device 102. In an embodiment, a reasoning engine (not shown in figure) may be implemented in the application managing system 101 to identify the reason and provide the reason to the user 103. The reason may be in form of the notification 218 to the user 103. In an embodiment, the notification 218 may be in form of a contextual message provided to the user 103. For example, the notification 218 for not being able to perform data transfer 401 through chatting application may be "Please Update Data Package Plan", if it is recognised that the data package plan 402 is not updated, from the relation tree 400b. If it is recognised that the data transfer may not be performed due to unavailability of the network connectivity, the notification 218 to the user 103 may be "Please check network connectivity of your device"

Consider a call initiating application in the smart watch. The relation tree 210 associated with the smart watch may be identified. The relation tree 210 may indicate the dependency of the call initiating application with the one or more parameters 212 and the one or more enablers 213 associated with the smart watch. In the smart watch, by the learning technique, the relation tree 210 may be generated to indicate that the call initiation through the smart watch may depend on one of Wi-Fi connectivity and Bluetooth connectivity with the smart phone. Upon performing the operation of the call initiation by the smart watch, the smart phone may be able to place the call. The one or more enablers 213 associated with the smart watch may be user input to the smart watch. In an embodiment, the user input may be one of a voice input and touch input to the smart watch. The application managing system 101 may identify the one or more enablers 213 for the electronic device and checks for the current status of the one or more enablers 213. If the current status of the enablers 215 may be detected to be initiation of the call, said one or more parameters 212 associated with the initiation of the call is identified. Current status of the one or more parameters 214 may be retrieved. When at least one of the Bluetooth connectivity and the Wi-Fi connectivity is available, the smart watch is instructed to initiate the call. When the Bluetooth connectivity and the Wi-Fi connectivity is not available, the smart watch may be instructed to not to initiate the call. In an embodiment, the notification 218 indicating the reason for the operation performed by the smart watch may be provided to the user 103 may send a request to the application managing system 101. In an embodiment, notification 218 to the user 103 may be at least one of "Please check Bluetooth connectivity of your device" and "Please check Wi-Fi connectivity of your device"

The other data 219 may store data, including temporary data and temporary files, generated by modules for performing the various functions of the application managing system 101. The one or more modules 108 may also include other modules 208 to perform various miscellaneous functionalities of the application managing system 101. It will be appreciated that such modules may be represented as a single module or a combination of different modules.

Figure 3A:
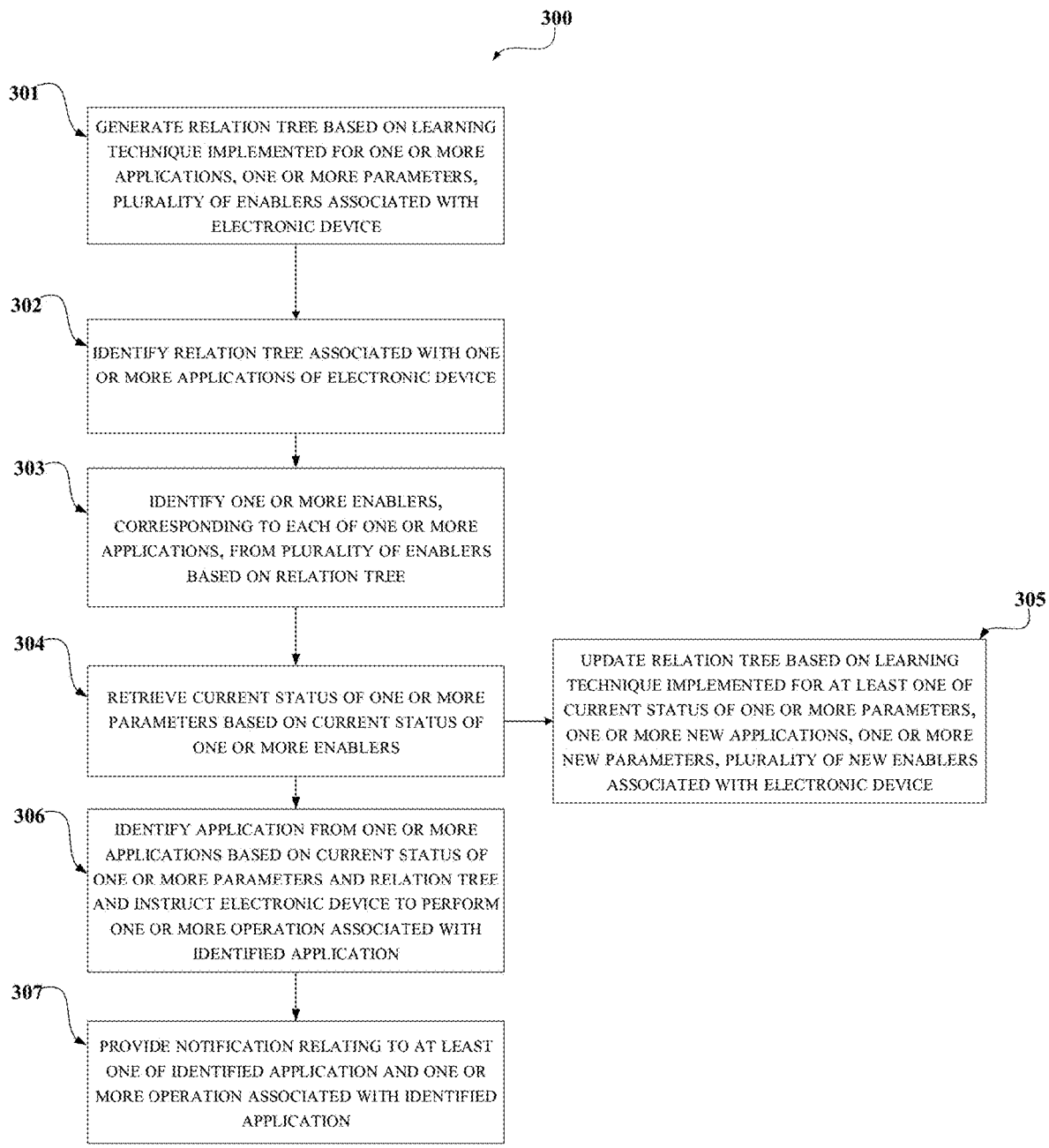
FIG. 3a illustrates a flowchart showing an exemplary method for managing one or more applications in an electronic device in accordance with some embodiments of present disclosure.

FIG. 3a illustrates a flowchart showing an exemplary method for managing the one or more applications 211 in the electronic device 102 in accordance with some embodiments of present disclosure.

At block 301, the relation tree generation module 201 of the application managing system 101 may generate the relation tree 210 based on learning technique implemented for the one or more applications 211, the one or more parameters 212, the plurality of enablers 213 associated with the electronic device 102. In an embodiment, the learning technique may include monitoring the one or more applications 211, the one or more parameters 212, the plurality of enablers 213 associated with the electronic device 102. Further, the relation tree 210 may be generated based on the monitoring.

At block 302, the relation tree identification module 203 of the application managing system 101 may identify the relation tree 210 associated with the one or more applications 211 of the electronic device 102. In an embodiment, the relation tree 210 may comprise plurality of nodes indicating the one or more applications 211, the one or more parameters 212, the plurality of enablers 213 associated with the electronic device 102.

At block 303, the enabler identification module 204 of the application managing system 101 may identify the one or more enablers from the plurality of enablers 213 based on the relation tree 210. The one or more enablers correspond to each of the one or more applications 211.

At block 304, the parameter status retrieving module 205 of the application managing system 101 may retrieve the current status of the one or more parameters 214 based on the current status of the one or more enablers 215. In an embodiment, the current status of the one or more parameters 214 may be retrieved from the status database 104 associated with the application managing system 101 and the electronic device 102.

At block 305, the relation tree updating module 202 of the application managing system 101 may update the relation tree 210 based on the learning technique implemented for at least one of the current status of the one or more parameters 214, the current status of one or more new applications 216, the current status of the one or more new parameters 214, the current status of the plurality of new enablers 215, associated with the electronic device 102.

At block 306, the application identification module 206 of the application managing system 101 may identify the application from the one or more applications 211 based on the current status of the one or more parameters 214 and the relation tree 210. Upon identifying the application, the application identification module 206 instructs the electronic device 102 to perform the one or more operations 217 associated with the identified application.

At block 307, the notification module 207 of the application managing system 101 may provide notification 218 relating to at least one of the identified application and the one or more operations 217 to the user 103 associated with the electronic device 102 for managing the one or more applications 211 in the electronic device 102.

Figure 3B:
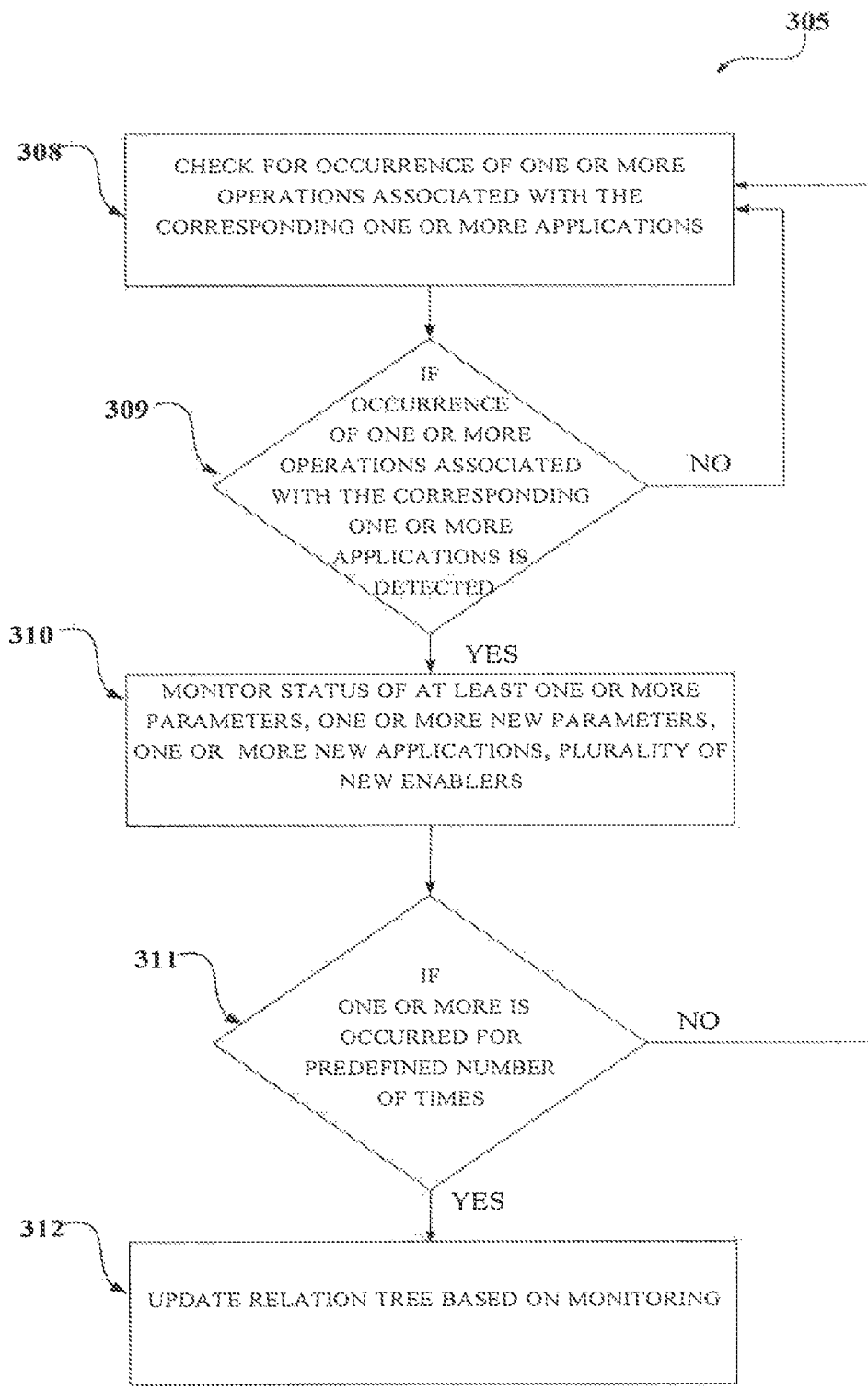
FIG. 3b illustrates a flowchart showing an exemplary method for updating relation tree based on learning technique for managing one or more applications in an electronic device in accordance with some embodiments of present disclosure.

FIG. 3b illustrates a flowchart showing an exemplary method for updating the relation tree 210 based on the learning technique for managing the one or more applications 211 in the electronic device 102 in accordance with some embodiments of present disclosure;

At block 308, the relation tree updating module 202 may monitor for occurrence of the one or more operations 217 associated with the corresponding one or more applications.

At block 309, the relation tree updating module 202 may detect the occurrence of the one or more operations 217. If the occurrence of the one or more operation 217 is detected, step in block 310 may be performed. If the occurrence of the one or more operation 217 is not detected, step in block 308 may be performed.

At block 310, the relation tree updating module 202 may monitor status of the at least one or more parameters 212, the one or more new parameters, the one or more new applications, and the plurality of new enablers.

At block 311, the relation tree updating module 202 may detect the occurrence of one or more operations for the predefined number of times. If the one or more operations 217 have occurred for the predefined number of times, step in block 312 may be performed. If the one or more operations 217 have not occurred for the predefined number of times, step in block 308 may be performed.

At block 312, the relation tree updating module 202 may update the relation tree 210 based on the monitoring. The updated relation tree 210 comprises dependency of the one or more operations 217 with the one or more new parameters 212, the one or more parameters 212, the plurality of enablers and the plurality of new enablers.

As illustrated in FIGS. 3a and 3b, the methods 300 and 305 may include one or more blocks for executing processes in the application managing system 101. The methods 300 and 305 may be described in the general context of computer executable instructions. Generally, computer executable instructions can include routines, programs, objects, components, data structures, procedures, modules, and functions, which perform particular functions or implement particular abstract data types.

The order in which the methods 300 and 305 are described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

Computing System

Figure 5:
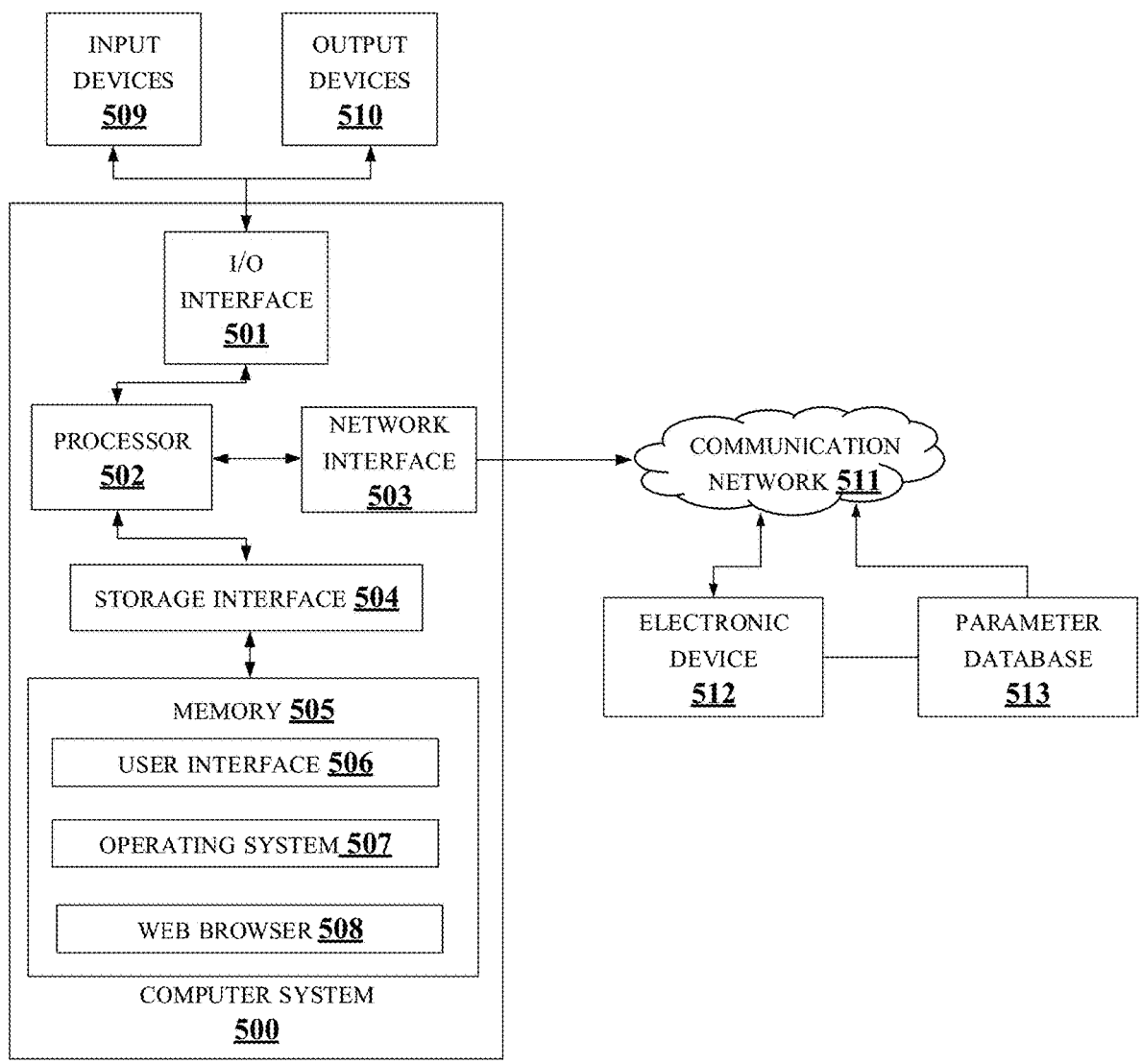
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 is used to implement the application managing system 101. The computer system 500 may include a central processing unit ("CPU" or "processor") 502. The processor 502 may include at least one data processor for executing processes in Virtual Storage Area Network. The processor 502 may include specialized processing units such as, integrated system (bus) controllers, memory management control units, floating point units, graphics processing units, digital signal processing units, etc.

The processor 502 may be disposed in communication with one or more input/output (I/O) devices 509 and 510 via I/O interface 501. The I/O interface 501 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices 509 and 510. For example, the input devices 509 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 510 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 500 may consist of the application management system 101. The processor 502 may be disposed in communication with the communication network 511 via a network interface 503. The network interface 503 may communicate with the communication network 511. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 511 may include, without limitation, a direct interconnection, local area network (LAN), wide area network (WAN), wireless network (e.g., using Wireless Application Protocol), the Internet, etc. Using the network interface 503 and the communication network 511, the computer system 500 may communicate with an electronic device 512 and a status database 513 for managing applications in the electronic device 512. The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 511 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as, serial advanced technology attachment (BATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507, a web browser 508 etc. In some embodiments, computer system 500 may store user/application data 506, such as, the data, variables, records, etc., as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, Apple Macintosh OS X, Unix, Unix-like system distributions (e.g., Berkeley Software Distribution (BSD), Free-BSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

Advantages

An embodiment of the present disclosure provisions to consider multiple attributes associated with an electronic device for managing applications in the electronic device.

An embodiment of the present disclosure provisions an automated application managing system by implemented a learning technique for one or more attributes associated with an electronic device.

An embodiment of the present disclosure discloses to provision contextual reasoning for performing one or more operation when managing corresponding applications.

An embodiment of the present disclosure provides a user-friendly electronic device to a user for automating operation of the electronic device.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media may include all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fibre, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIGS. 3a and 3b show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100a and 100b | Environment |
| 101 | Application managing system |
| 102 | Electronic device or electronic devices |
| 103 | User |
| 104 | Status database |
| 105 | Communication network |
| 106 | Processor |
| 107 | I/O network |
| 108 | Modules |
| 109 | Memory |
| 201 | Relation tree generation module |
| 202 | Relation tree updating module |
| 203 | Relation tree identification module |
| 204 | Enabler identification module |
| 205 | Parameter status retrieving module |
| 206 | Application identification module |
| 207 | Notification module |
| 208 | Other modules |
| 209 | Data |
| 210 | Relation tree data |
| 211 | Application data |
| 212 | Parameter data |
| 213 | Enabler data |
| 214 | Parameter status data |
| 215 | Enabler status data |
| 216 | Application status data |
| 217 | Operation data |
| 218 | Notification data |
| 219 | Other data |
| 400a | Relation tree |
| 400b | Updated relation tree |
| 401 | Data transfer through chatting application |
| 402 | Data package plan |
| 403 | Data connectivity |
| 404 | Network connectivity |
| 405 | Wi-Fi connectivity |
| 406 | Accessibility to Wi-Fi connectivity |
| 407 | Antenna |
| 500 | Computer System |
| 501 | I/O Interface |
| 502 | Processor |
| 503 | Network Interface |
| 504 | Storage Interface |
| 505 | Memory |
| 506 | User Interface |
| 507 | Operating System |
| 508 | Web Server |
| 509 | Input Devices |
| 510 | Output Devices |
| 511 | Communication Network |
| 512 | Electronic device |
| 513 | Status database |

What is claimed is:

1. A method for managing applications in an electronic device, comprising:

identifying, by an application managing system, a relation tree associated with one or more applications of an electronic device, wherein the relation tree comprises of a plurality of nodes associated with the one or more parameters, the one or more operations, and the plurality of enablers for an application from the one or more applications, wherein the relation tree is generated based on a learning technique implemented for the one or more applications, one or more parameters, or plurality of enablers associated with the electronic device;

identifying, by the application managing system, one or more enablers from the plurality of enablers, corresponding to each of the one or more applications, based on the relation tree;

retrieving, by the application managing system, current status of the one or more parameters based on current status of the one or more enablers, wherein the relation tree is updated based on the learning technique implemented for at least one of the current status of the one or more parameters, one or more new applications, one or more new parameters, plurality of new enablers associated with the electronic device; and identifying, by the application managing system, an application from the one or more applications based on the current status of the one or more parameters and the relation tree, wherein the electronic device is instructed to perform one or more operations associated with the identified application.

2. The method as claimed in claim 1 further comprising providing, by the application managing system, a notification relating to at least one of the identified application and the one or more operations, to a user associated with the electronic, device, for managing the one or more applications in the electronic device.

3. The method as claimed in claim 1, wherein updating the relation tree based on the learning technique comprises:

monitoring status of at least one of the one or more parameters, the one or more new parameters, the one or more new applications, and the plurality of new enablers, wherein the monitoring is performed for predefined number of occurrence of one or more operations associated with corresponding new one or more applications; and updating the relation tree based on the monitoring, wherein the updated relation tree comprises dependency of the one or more operations with the one or more new parameters, the one or more parameters, the plurality of enablers and the plurality of new enablers.

4. The method as claimed in claim 1, wherein the one or more parameters comprises at least one of user parameters, environment parameters and application parameters associated with the one or more applications of the electronic device.

5. The method as claimed in claim 1, wherein the relation tree indicates dependency of the one or more operations of the application with the one or more parameters and the plurality of enablers.

6. An application managing system for managing applications in an electronic device, comprises:

a processor; and a memory communicatively coupled to the processor, wherein the memory stores processor-executable instructions, which, on execution, cause the processor to:

identify a relation tree associated with one or more applications of an electronic device, wherein the relation tree comprises of a plurality of nodes associated with the one or more parameters, the one or more operations, and the plurality of enablers for an application from the one or more applications, wherein the relation tree is generated based on a learning technique implemented for the one or more applications, one or more parameters, or plurality of enablers associated with the electronic device;

identify one or more enablers from the plurality of enablers, corresponding to each of the one or more applications, based on the relation tree;

retrieve current status of the one or more parameters based on current status of the one or more enablers, wherein the relation tree is updated based on the learning technique implemented for at least one of the current status of the one or more parameters, one or more new applications, one or more new parameters, plurality of new enablers associated with the electronic device; and identify an application from the one or more applications based on the current status of the one or more parameters and the relation tree, wherein the electronic device is instructed to perform one or more operations associated with the identified application.

7. The application managing system as claimed in claim 6 further comprises the processor configured to provide a notification relating to at least one of the identified application and the one or more operations, to a user associated with the electronic device, for managing the one or more applications in the electronic device.

8. The application managing system as claimed in claim 6, wherein updating the relation tree based on the learning technique comprises:

monitoring status of at least one of the one or more parameters, the one or more new parameters, the one or more new applications, and the plurality of new enablers, wherein the monitoring is performed for predefined number of occurrence of one or more operations associated with corresponding new one or more applications; and updating the relation tree based on the monitoring, wherein the updated relation tree comprises dependency of the one or more operations with the one or more new parameters, the one or more parameters, the plurality of enablers and the plurality of new enablers.

9. The application managing system as claimed in claim 6, wherein the one or more parameters comprises at least one of user parameters, environment parameters and application parameters associated with the one or more applications of the electronic device.

10. A non-transitory computer readable medium including instructions stored thereon that when processed by at least one processor cause a device to perform operations comprising:

identifying a relation tree associated with one or more applications of an electronic device, wherein the relation tree comprises of a plurality of nodes associated with the one or more parameters, the one or more operations, and the plurality of enablers for an application from the one or more applications, wherein the relation tree is generated based on a learning technique implemented for the one or more applications, one or more parameters, or plurality of enablers associated with the electronic device;

identifying one or more enablers from the plurality of enablers, corresponding to each of the one or more applications, based on the relation tree;

retrieving current status of the one or more parameters based on current status of the one or more enablers, wherein the relation tree is updated based on the learning technique implemented for at least one of the current status of the one or more parameters, one or more new applications, one or more new parameters, plurality of new enablers associated with the electronic device; and identifying an application from the one or more applications based on the current status of the one or more parameters and the relation tree, wherein the electronic device is instructed to perform one or more operations associated with the identified application.

11. The medium as claimed in claim 10 further comprises providing, by the application managing system, a notification relating to at least one of the identified application and the one or more operations, to a user associated with the electronic device, for managing the one or more applications in the electronic device.

12. The medium as claimed in claim 10, wherein updating the relation tree based on the learning technique comprises:
monitoring status of at least one of the one or more parameters, the one or more new parameters, the one or more new applications, and the plurality of new enablers, wherein the monitoring is performed for predefined number of occurrence of one or more operations associated with corresponding new one or more applications; and
updating the relation tree based on the monitoring, wherein the updated relation tree comprises dependency of the one or more operations with the one or more new parameters, the one or more parameters, the plurality of enablers and the plurality of new enablers.

13. The medium as claimed in claim 10, wherein the one or more parameters comprises at least one of user parameters, environment parameters and application parameters associated with the one or more applications of the electronic device.

* * * * *